United States Patent [19]

Loker

[11] Patent Number: 4,593,942
[45] Date of Patent: Jun. 10, 1986

[54] COUPLING FOR THIN-WALLED FLEXIBLE HOSE

[75] Inventor: Ernest B. Loker, Edgewater, Md.

[73] Assignee: Hydrasearch Co., Inc., Annapolis, Md.

[21] Appl. No.: 631,055

[22] Filed: Jul. 16, 1984

[51] Int. Cl.$^4$ ............................................. F16L 33/18
[52] U.S. Cl. .................................. 285/253; 285/259; 285/347
[58] Field of Search ............... 285/253, 243, 259, 252, 285/347

[56] References Cited

U.S. PATENT DOCUMENTS

| | | |
|---|---|---|
| 237,324 | 2/1881 | Reynolds . |
| 371,231 | 10/1887 | Turner . |
| 576,119 | 2/1897 | Hess . |
| 1,004,634 | 10/1911 | Dixon . |
| 1,286,388 | 12/1918 | Mulconroy . |
| 1,382,840 | 6/1921 | Levedahl . |
| 1,731,320 | 10/1929 | Ratcliffe . |
| 1,801,261 | 4/1931 | Bailey ............................ 285/252 X |
| 1,913,030 | 6/1933 | Hux . |
| 1,971,105 | 8/1934 | Hartman et al. . |
| 2,119,645 | 6/1938 | Pearson . |
| 2,358,575 | 9/1944 | Hurley . |
| 2,453,997 | 11/1948 | MacWilliam . |
| 2,562,116 | 7/1951 | Nelson . |
| 2,819,916 | 1/1958 | Seifert . |
| 3,073,628 | 1/1963 | Cline et al. . |
| 3,087,746 | 4/1963 | Hamilton et al. ................... 285/243 |
| 3,140,884 | 7/1964 | Brauck . |
| 3,167,334 | 1/1965 | Cline et al. ........................ 285/243 |
| 3,185,500 | 5/1965 | Luther . |
| 3,224,794 | 12/1965 | Crissy . |
| 3,257,132 | 6/1966 | Lyons ................................. 285/253 |
| 3,326,006 | 6/1967 | Mount ................................. 285/382 |
| 3,347,571 | 10/1967 | New . |
| 3,363,680 | 1/1968 | Baker ................................. 285/382 X |
| 3,375,025 | 3/1968 | Engel . |
| 3,432,187 | 3/1969 | Mooney et al. . |
| 3,472,536 | 10/1969 | Ingram . |
| 3,495,855 | 2/1970 | Currie . |
| 3,687,491 | 8/1972 | Marshall . |
| 4,039,212 | 8/1977 | Skarud . |
| 4,139,224 | 2/1979 | Leach . |
| 4,486,036 | 12/1984 | Storke et al. ........................ 285/253 |

FOREIGN PATENT DOCUMENTS

| | | |
|---|---|---|
| 212881 | 4/1957 | Australia . |
| 902923 | 1/1954 | Fed. Rep. of Germany ...... 285/259 |
| 941399 | 4/1956 | Fed. Rep. of Germany . |
| 1206234 | 12/1965 | Fed. Rep. of Germany . |
| 2506874 | 8/1976 | Fed. Rep. of Germany ...... 285/259 |
| 2810589 | 9/1979 | Fed. Rep. of Germany ...... 285/252 |
| 1101516 | 4/1955 | France . |
| 1158142 | 1/1958 | France . |
| 1558575 | 1/1969 | France . |
| 2391413 | 12/1978 | France . |
| 275802 | 8/1927 | United Kingdom ................ 285/253 |

Primary Examiner—Thomas F. Callaghan
Attorney, Agent, or Firm—Schwartz, Jeffery, Schwaab, Mack, Blumenthal & Evans

[57] ABSTRACT

A coupling and method of coupling thin-walled/tubing and the like includes an inner member and an outer member in the form of a sleeve or band surrounding the inner member with the tubing therebetween. The inner member is provided with a pair of tubing grooves and a seal receiving groove between the two tubing grooves or at least between one groove and the tube receiving end of the coupling. By means of annular ridges, the tubing is forced into the tubing grooves, and by means of an annular ridge the tubing is pressed tightly against the seal in the seal receiving groove, thus forming a fluid-tight coupling member.

8 Claims, 3 Drawing Figures

COUPLING FOR THIN-WALLED FLEXIBLE HOSE

BACKGROUND OF THE INVENTION

1. Field of the Invention

This invention relates to a reusable coupling, and more particularly to a coupling for use with thin-walled flexible hose or tubing.

2. Prior Art

It is a common practice to utilize hose clamps and the like for coupling and securing relatively thick-walled rubber hoses and the like. The hose clamp can be tightened into the rubber hose wherein, by means of sufficient pressure, the hose clamp will exert sufficient force on the hose, deforming same, to create a tight seal between the hose and the article to which it is clamped. Essentially, it is the inner resilience of the hose against the nipple to which it is pressed which performs the sealing.

However, with the advent of very thin hose or tubing, with a wall thickness of about 0.125 inch having, for example, a woven polyester and nylon carcass with a urethane coating (of the type sold commercially by Angus Fire Armour, Inc., under the name "CHEMI-COIL"), it is impossible to successfully utilize conventional hose clamps. The terms "hose" and "tubing" used throughout the application are interchangeable and designate thin-walled flexible articles primarily of non-metallic material. What has been done in the past is to place a large number of hose clamps adjacent each other on the tubing. By sheer numbers and forces, it has been possible to secure the hose. While such procedure may be acceptable for irrigation water and the like, it is not acceptable for use with fluids which can contaminate the environment.

RELATED ART

Application Ser. Nos. 428,051 now U.S. Pat. No. 4,486,035 and 428,053 now U.S. Pat. No. 4,486,036 by Francis J. Storke and Francis J. Storke, Carl L. Grayson and Ernest B. Loker, respectively, which applications are commonly owned, disclose similar couplings of which the instant invention is closely related. The above referred to applications and disclosures are hereby incorporated by reference.

OBJECTS AND SUMMARY OF THE INVENTION

It is an object of the instant invention to provide a coupling which produces a good seal between the tubing and the article to which it is attached.

Another object is to provide reusable couplings which can be recoupled in the field and can be assembled with no special tools.

Still another object is to provide a coupling which can withstand relatively high pressures compared to its size.

A further object is to provide means for coupling lenths of thin-walled hose/tubing together which can withstand relatively high pressures with extreme longitudinal pull, such as encountered in conveying such diverse fluids as drinking water, fuel, oil or the like from off-shore vessels to installations or facilities on-shore without leakage and/or contamination of the environment.

A specific feature and object of the instant invention which is an improvement over the prior art and the two above referred to applications is the ease with which the tubing may be slid over the seal arrangement, thus facilitating the assembly.

A further object is to provide a coupling structure which can be used with segmented or bracketed outer clamping members, as well as with thinner, band clamps.

A coupling and method of coupling thin-walled/tubing and the like includes an inner member and an outer member in the form of a sleeve or band surrounding the inner member with the tubing therebetween. The inner member is provided with a pair of tubing grooves and a seal receiving groove between the two tubing grooves or at least between one groove and the tube receiving end of the coupling. By means of annular ridges, the tubing is forced into the tubing grooves, and by means of an annular ridge the tubing is pressed tightly against the seal in the seal receiving groove, thus forming a fluid-tight coupling member.

BRIEF DESCRIPTION OF THE DRAWINGS

The above and other objects and advantages of the invention will be appreciated from the following description and accompanying drawings, wherein.

DETAILED DESCRIPTION OF THE INVENTION

Figure 1:
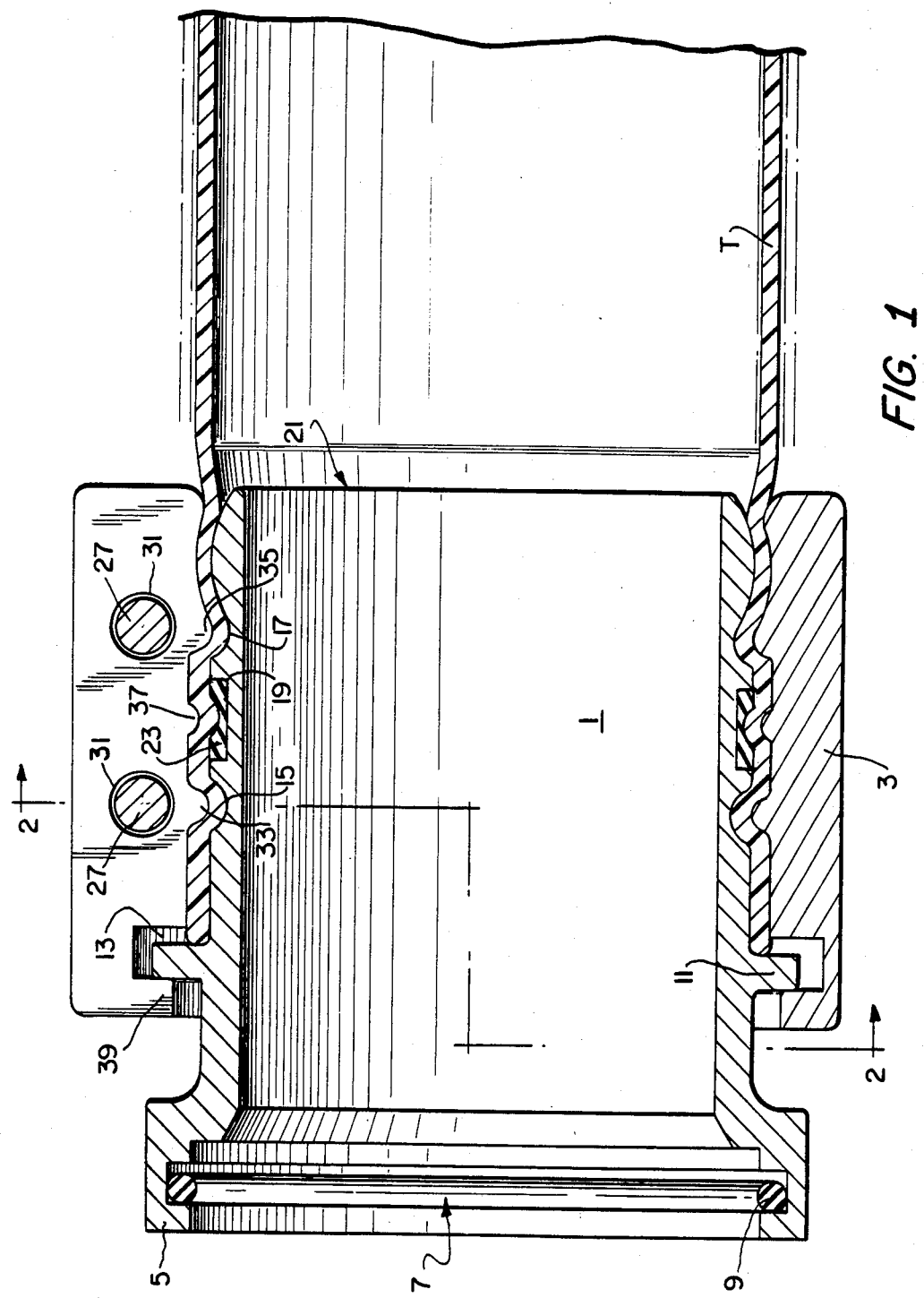
FIG. 1 is a side elevation view in cross-section of a first embodiment of the invention.
Figure 2:
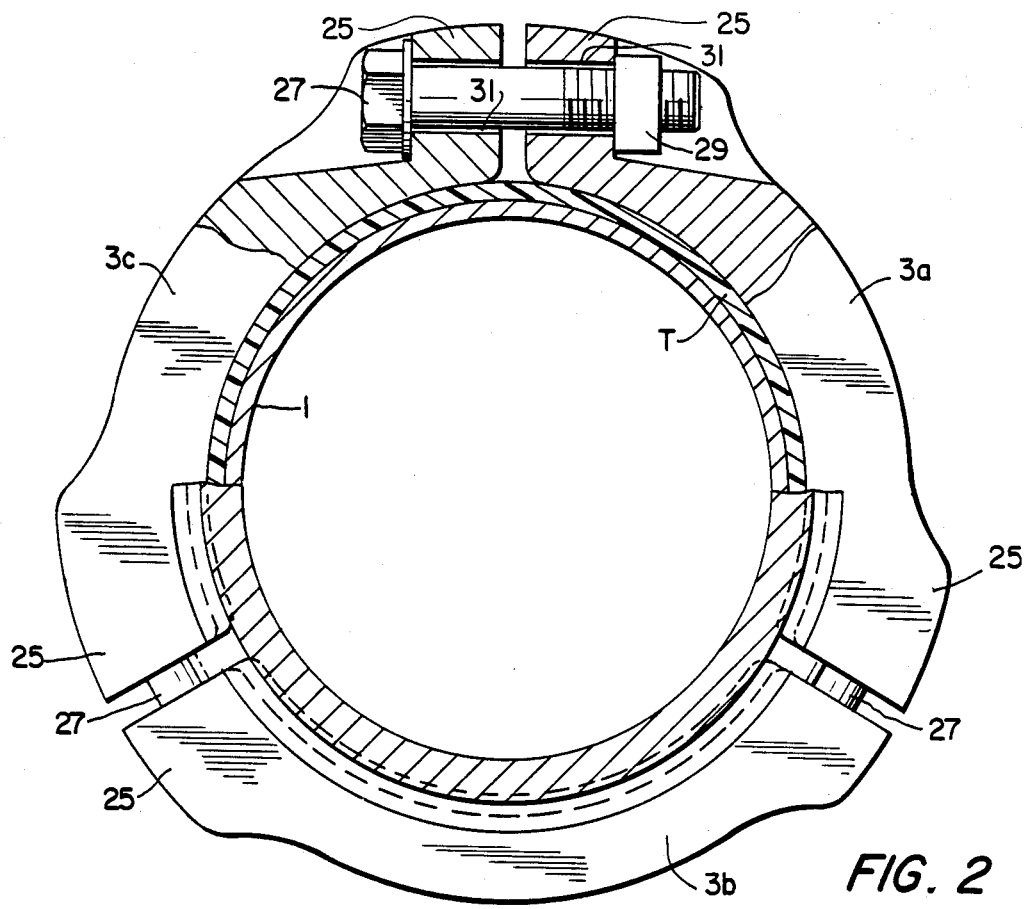
FIG. 2 is a side elevation view, partially in cross-section taken along lines 2—2 of FIG. 1.

Referring to FIG. 1, a coupling is seen having a first female inner member 1, surrounded by a second member 3 seen in the form of three segmented members 3a, 3b and 3c in FIG. 2. Obviously, inner member 1 could be the male nipple portion of the coupling. A nipple 5 is essentially of standard design having a connecting portion generally seen at 7 which in turn will cooperate with the corresponding male portion. An O ring 9 is seen in the female nipple end 7. The inner member 1 includes a retainer flange 11 which cooperates with a groove 13 on the outer member 3.

The inner member has a first annular hosing/tubing groove 15 and a second annular hose/tubing groove 17, together with a wider, generally rectangular annular seal receiving groove 19. In the modification shown in FIG. 1 the groove 19 is between grooves 15 and 17. It will be appreciated that while this is the preferred embodiment, it may be possible to eliminate groove 17 so that the location of grooves 15 and 19 is between their present location in the drawing and the tube receiving end of the coupling seen generally at 21. A generally flat annular seal of conventional sealing material such as rubber or the like is seen at 23 in groove 19. Groove 19 is initially wider than seal 23 to thereby accommodate the seal when it is stretched and compressed therein.

In the modifications of FIGS. 1 and 2 the outer member or sleeve 3 is formed preferably in three parts joined together in FIG. 2 by means of a pair of segments 25 with a bolt 27 and nut 29, the bolt extending through a pair of complementary openings 31 in segments 25 in the conventional manner.

The outer member includes a first annular ridge 33 and a second annular ridge 35 which cooperate with grooves 15 and 17, respectively. A third annular ridge 37 cooperates with seal 23 and seal receiving groove 19 in the manner discussed below.

An end flange 39, cooperating with flange 11, locates the outer sleeve or member 3 so that annular ridges 33, 35 and 37 align with grooves 15, 17 and 19, respectively. Tubing T is seen in the assembled unit between the inner and outer members.

OPERATION

The annular seal 23 is positioned in groove 19, and the inner member/nipple 1 is slid into tubing T, and the three segments 3a, 3b and 3c are placed in the position shown in FIG. 2. The bolts 27 are inserted through openings 31 and nuts 29 are tightened so that the annular ridges 33 and 35 force the tubing into annular grooves 15 and 17, respectively. The tubing is further stretched over and compressed into seal 23 and annular ridge 37 assists in further exerting a force on the sealing material 23 to create a fluid tight arrangement. The seal 23 thus substantially fills the groove 19 when segments 3a-3c are bolted together.

While the wall thickness of the tubing is normally made with close tolerances, the diameter may vary slightly. Thus, with the arrangement shown, not only will the tubing be able to easily slip over the inner member, slight deviations in the diameter of the tubing can be accommodated by means of the various ridge and groove arrangements discussed above.

BAND CLAMP MODIFICATION

Figure 3:
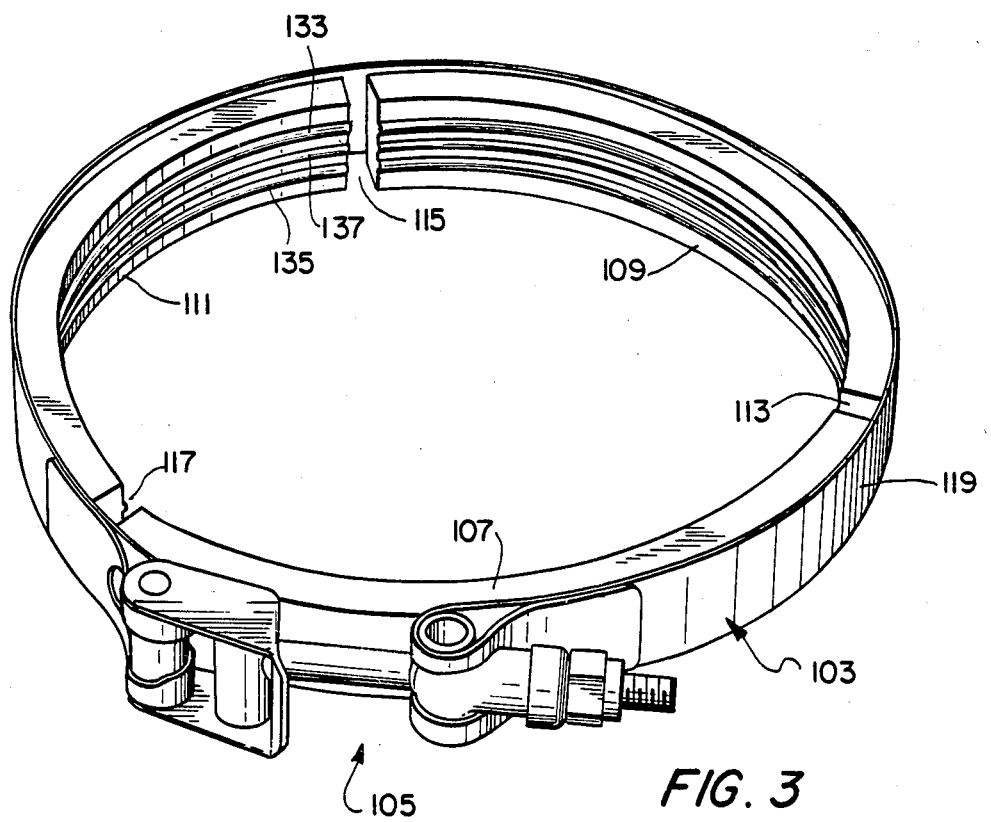
FIG. 3 is a perspective view of a second embodiment of the invention.

Referring to FIG. 3, a band clamp can be utilized in place of the outer member/segments 3 shown in FIGS. 1 and 2. Specifically, a band clamp 103 is seen having a conventional T-bold latch 105. This is used to join a plurality of segmented elements 107, 109 and 111 having spaces 113, 115 and 117 therebetween. These are joined together by an outer band 119. In place of the T-bold latch seen in FIG. 3, it would be possible to use other conventional quick release latches, saddle quick release latches or the like. Each of the three segments 107, 109 and 111 have a plurality of annular ridges 133, 135 and 137 which correspond to grooves 15, 17 and 19 respectively. The coupling is assembled in the same manner as discussed above; however, instead of bolting the three segments 3a, 3b and 3c together, the outer member 103 would be slid over the tubing and the latch tightened so that the segments 107, 109 and 111 will cause the annular ridges 133, 135 and 137 to cooperate with the tubing, seal and the respective grooves 15, 17 and 19. This latter modification is obviously a lighter weight modification of the above discussed structure.

While one embodiment of the invention has been described, it will be understood that it is capable of further modification, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A coupling for use with flexible hose, tubing and the like comprising:
    (a) a first member,
    (b) a second member surrounding said first member,
    (c) said members each having a tubing receiving end,
    (d) means for receiving and retaining tubing positioned between said members, said receiving and retaining means comprising:
        (1.) at least one first substantially annular tubing groove on one of said members,
        (2.) a substantially annular seal receiving groove on one of said members between said tubing receiving end and said one tubing groove,
        (3.) a first substantially annular, rounded ridge cooperating with the tubing and said tubing groove for forcing the tubing into said tubing groove without cutting or biting into the tubing,
        (4.) sealing means having a greater width than thickness and a width smaller than said sealing groove and about the same thickness as said sealing groove in said seal receiving groove,
        (5.) a second substantially annular means in the form of a substantially annular rounded ridge element on the other of said members cooperating with said tubing and said sealing means for exerting a force into said sealing means without cutting or biting into the tubing.

2. A coupling as defined in claim 1 including a pair of tubing grooves and a pair of first annular means.

3. A coupling as defined in claim 2 wherein said seal receiving groove is between said pair of grooves.

4. A coupling as defined in claim 1 wherein said tubing groove is on said inner member.

5. A coupling as defined in claim 1 wherein said seal receiving groove is on said first member and said second annular means is on said second member, said first member being an inner member and said second member being an outer member.

6. A coupling as defined in claim 1 wherein said outer member is in the form of a plurality of interconnected segments.

7. A coupling as defined in claim 6 wherein said interconnected segments are joined together by nuts and bolts.

8. A coupling as defined in claim 6 wherein said interconnected segements are joined together by a band.

* * * * *